United States Patent
Blondel et al.

(10) Patent No.: US 9,102,828 B2
(45) Date of Patent: *Aug. 11, 2015

(54) COMPOSITION INCLUDING A COPOLYAMIDE AND A CROSS-LINKED POLYOLEFIN

(75) Inventors: Philippe Blondel, Bernay (FR); Thierry Briffaud, Caorches Saint Nicolas (FR); Vincent Ferreiro, Pont du Chateau (FR)

(73) Assignee: ARKEMA FRANCE, Colombes (FR)

( * ) Notice: Subject to any disclaimer, the term of this patent is extended or adjusted under 35 U.S.C. 154(b) by 201 days.

This patent is subject to a terminal disclaimer.

(21) Appl. No.: 13/388,693

(22) PCT Filed: Aug. 5, 2010

(86) PCT No.: PCT/FR2010/051659
§ 371 (c)(1),
(2), (4) Date: Apr. 24, 2012

(87) PCT Pub. No.: WO2011/015790
PCT Pub. Date: Feb. 10, 2011

(65) Prior Publication Data
US 2012/0202896 A1    Aug. 9, 2012

(30) Foreign Application Priority Data
Aug. 6, 2009   (WO) ................ PCT/FR2009/051565

(51) Int. Cl.
*B32B 27/34* (2006.01)
*C08L 23/26* (2006.01)
*C08L 77/06* (2006.01)
*C08L 77/02* (2006.01)
*C08L 77/00* (2006.01)
*C08L 23/08* (2006.01)
*C08L 33/06* (2006.01)

(52) U.S. Cl.
CPC ................ *C08L 77/02* (2013.01); *C08L 77/00* (2013.01); *C08L 77/06* (2013.01); *C08L 23/0869* (2013.01); *C08L 23/0884* (2013.01); *C08L 33/064* (2013.01); *C08L 33/068* (2013.01); *C08L 2205/22* (2013.01)

(58) Field of Classification Search
USPC ......... 428/36.8, 36.9, 36.91, 36.92, 357, 402, 428/474.4; 524/514, 538; 525/66, 179, 182, 525/183
See application file for complete search history.

(56) References Cited

U.S. PATENT DOCUMENTS

| 5,003,009 A | 3/1991 | Matthies et al. |
|---|---|---|
| 5,292,808 A | 3/1994 | Ohmae et al. |
| 5,440,006 A | 8/1995 | Lahary et al. |
| 2005/0096430 A1* | 5/2005 | Blondel et al. ............... 525/178 |
| 2006/0074158 A1 | 4/2006 | Blondel et al. |
| 2009/0098325 A1* | 4/2009 | Uchida et al. ............. 428/36.91 |

FOREIGN PATENT DOCUMENTS

| EP | 0 212 510 A2 | 3/1987 |
|---|---|---|
| EP | 1 505 099 A2 | 2/2005 |
| JP | 2008179753 A | 8/2008 |
| WO | WO 2010/015785 A1 | 2/2010 |

OTHER PUBLICATIONS

International Search Report of PCT/FR2010/051659 (Feb. 23, 2011).
JP2008-179753; dated Aug. 7, 2008; Machine Translation.

* cited by examiner

*Primary Examiner* — Ana Woodward
(74) *Attorney, Agent, or Firm* — Millen, White, Zelano & Branigan, P.C.

(57) ABSTRACT

The invention relates to a composition including: 45 to 95 wt % of a semi-aromatic copolyamide containing at least two separate units having the following general formulation: A/X.T, where A is selected from among a unit obtained from an amino acid, a unit obtained from a lactam, and a unit having the formula (diamine Ca).(diacid in Cb), and XT denotes a unit obtained from the polycondensation of a diamine in Cx and from terephthalic acid, with x being the number of carbon atoms of the diamine in Cx, said copolyamide having a polymoleoularity index, noted Ip, of less than or equal to 3.5, measured by gel permeation chromatography, and an amino chain end content of between 0.020 meg/g and 0.058 meg/g; and 5 to 55 wt % of at least one cross-linked polyolefin. The invention also relates to a method for preparing said composition and to the uses thereof.

15 Claims, No Drawings

COMPOSITION INCLUDING A COPOLYAMIDE AND A CROSS-LINKED POLYOLEFIN

The present invention relates to a composition comprising at least one semiaromatic copolyamide and at least one crosslinked polyolefin, to the process for preparing it, and to its uses, especially in the manufacture of various objects, for instance common consumer goods such as electrical, electronic or motor vehicle equipment, surgical material, wrapping or sports articles.

THE PRIOR ART AND THE TECHNICAL PROBLEM

In the motor vehicle industry, for example, polyamides 12 and 11 are widely used on account of their noteworthy mechanical properties, their ease of use and their resistance to aging. However, beyond a working temperature of 160° C., their thermomechanical strength is insufficient.

Copolyamides of formula 11/10.T, which result from the polycondensation of 11-aminoundecanoic acid, 1,10-decanediamine and terephthalic acid, can replace polyamides 12 and 11, while at the same time leading to improved thermomechanical behavior, and while also conserving their ease of transformation and their flexibility.

Document FR 2 782 725 describes a thermoplastic composition comprising a crosslinked phase and a polyamide phase that is preferentially aliphatic, leading to a readily granulable material with a broad extruder operating range.

Document US 2008/0038499 also describes a composition comprising a particular semiaromatic copolyamide and a polyolefin for the manufacture of water pipes for motor vehicles.

Now, these compositions still remain to be improved, in particular in terms of ease of use, especially during the preparation step (conventionally by compounding) for the production of the composition itself and also during the step of transformation of the composition into a material.

Document EP 1 505 099 describes compositions comprising from 60% to 99.5% by weight of a semiaromatic copolyamide and from 0.5% to 40% by weight of crosslinked polyolefins. Although the described compositions may be prepared in a satisfactory manner during a compounding step, it nevertheless remains that the step for transforming these compositions into a material that has good thermomechanical properties is not entirely satisfactory, especially when this transformation step is performed by extrusion, coextrusion or extrusion-blow molding.

Thus, there is a real need to find novel compositions that have improved properties in terms of ease of preparation (compounding) and of transformation, especially by extrusion, coextrusion or extrusion-blow molding, while at the same time conserving the advantages described above for the materials obtained from these compositions, especially in terms of resistance to high temperature.

BRIEF DESCRIPTION OF THE INVENTION

The Applicant has found, surprisingly, that this need is achieved with a composition comprising:
from 45% to 95% by weight, relative to the total weight of the composition, of a copolyamide comprising at least two different units corresponding to the following general formula:
A/X.T, in which A is chosen from a unit obtained from an amino acid, a unit obtained from a lactam and a unit corresponding to the formula (Ca diamine).(Cb diacid), with a representing the number of carbon atoms in the diamine and b representing the number of carbon atoms in the diacid, a and b each being between 4 and 36;

X.T denotes a unit obtained from the polycondensation of a Cx diamine and from terephthalic acid, with x representing the number of carbon atoms in the Cx diamine, x being between 4 and 36, said copolyamide having a polydispersity index, noted as Ip, of less than or equal to 3.5, measured by gel permeation chromatography, said copolyamide having a content of amine chain ends of between 0.020 meq/g and 0.058 meq/g; and from 5% to 55% by weight, relative to the total weight of the composition, of at least one crosslinked polyolefin.

The invention also relates to a process for preparing the composition, and to the uses thereof.

DETAILED DESCRIPTION OF THE INVENTION

Other characteristics, aspects, subjects and advantages of the present invention will emerge even more clearly on reading the description and the examples that follow.

It is pointed out that the term "between" used in the preceding paragraphs, but also in the rest of the present description, should be understood as including each of the mentioned limits.

Polydispersity Index

The polydispersity index gives a first idea of the distribution of the molar masses of the various macromolecules within the polymer. For a perfect polymer, in which all the macromolecules are linear, have the same length, and consequently the same molar mass, the polydispersity index Ip would be equal to 1. For a polyamide obtained by polycondensation from, among other monomers, diamines and dicarboxylic acids, the expected polydispersity index is 2.0.

A polydispersity index of greater than 2 may be due to the presence of branches on the main polymer chain. In the case of copolyamides, they may appear on the nitrogen atom of the amide function. Thus, they may be quantified by NMR (Nuclear Magnetic Resonance) by comparing the proportion of tertiary (branched) aromatic amide to the proportion of secondary (linear) aromatic amide.

Thus, the Applicant has found that by selecting the copolyamide as a function of its polydispersity index and especially by choosing it to be less than or equal to 3.5, the copolyamide has improved properties within the composition.

This index is conventionally measured, in a manner known to those skilled in the art, by steric exclusion chromatography or gel permeation chromatography as indicated above. Preferably, the polydispersity index of the copolyamides according to the invention is measured by gel permeation chromatography. More particularly, it is measured in a solvent that is suitable for the copolyamide, such as a fluorinated solvent, for instance hexafluoroisopropanol, at a temperature of between 20° C. and 50° C., preferably at 40° C.

Control of the polydispersity index may be performed during the synthesis of the polymer by using hypophosphorous acid.

Preferably, the copolyamide used in the composition according to the invention has a polydispersity index of between 2 and 3.5.

The End of the Amine Chains

The Applicant has also found, surprisingly, that it was necessary not only to control the polydispersity index of the copolyamide, but also to control precisely the amount of certain reactive functions and, possibly, the amount of unreactive functions present in this copolyamide.

The content of amine functions in the chain ends is measured conventionally, in a manner known to those skilled in the art, by NMR (Nuclear Magnetic Resonance).

Termination of the amine chains may be performed during the synthesis of said copolyamide by using chain terminators, which react with the amine end functions of the copolyamides, thus stopping the reactivity of the end of the macromolecule, and especially the polycondensation.

The termination reaction may be illustrated in the following manner:

Polyamide-$NH_2$+R—$CO_2H$→Polyamide-NH—CO—R+$H_2O$

Polyamide-$NH_2$+HCl→Polyamide-$NH_3^+Cl^-$

Thus, the chain terminators that are suitable for reacting with the amine end function may be monocarboxylic acids, anhydrides, monohalogenated acids, monoesters, monoisocyanates or mineral acids such as HCl, $HNO_3$ and $H_2SO_4$.

Thus, in order to achieve the objective aimed at obtaining a composition that can simultaneously achieve excellent thermomechanical properties and improved preparation and transformation properties when compared with the compositions of the prior art, the Applicant has observed that, in addition to the polydispersity index value required and mentioned above, the content of amine chain ends should be between 0.020 and 0.058 meq/g and preferably between 0.030 and 0.050 meq/g.

In particular, by virtue of these particular polydispersity index values and the content of amine chain end values required for the copolyamide included in the composition according to the invention, a composition is obtained that is fully compatible with the conventional processes for transforming thermoplastic compositions, namely, inter alia, extrusion, injection and multiinjection. The composition according to the invention is in particular fully compatible with transformation by extrusion, coextrusion or extrusion-blow molding.

The Other Terminations

In one particular variant, the copolyamide of the composition according to the invention may have:

a content of acid chain ends of less than or equal to 0.100 meq/g, advantageously between 0.002 and 0.080 meq/g and preferably between 0.015 and 0.050 meq/g, and/or a content of unreactive chain ends of greater than or equal to 0.020 meq/g, advantageously greater than or equal to 0.030 meq/g and preferably between 0.035 and 0.200 meq/g.

As previously, the content of acid functions and unreactive functions in the chain ends is measured conventionally, in a manner known to those skilled in the art, by NMR (Nuclear Magnetic Resonance).

The Chemical Structure of the Copolyamide

According to a first aspect of the invention, the composition according to the invention comprises at least one copolyamide comprising at least two different units of the following formula:

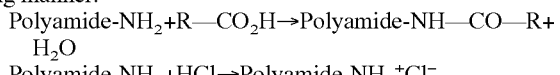

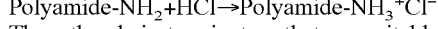

A is chosen from a unit obtained from an amino acid, a unit obtained from a lactam and a unit corresponding to the formula (Ca diamine).(Cb diacid), with a representing the number of carbon atoms in the diamine and b representing the number of carbon atoms in the diacid, a and b each being between 4 and 36;

X.T denotes a unit obtained from the polycondensation of a Cx diamine and from terephthalic acid, with x representing the number of carbon atoms in the Cx diamine, x being between 4 and 36, advantageously between 9 and 18 and preferentially between 10 and 18.

As more specifically regards the meaning of the unit A when A represents an amino acid, it may be chosen from 9-aminononanoic acid (A=9), 10-aminodecanoic acid (A=10), 10-aminoundecanoic acid (A=11), 12-amino-dodecanoic acid (A=12) and 11-aminoundecanoic acid (A=11), and also derivatives thereof, especially N-heptyl-11-aminoundecanoic acid.

In place of an amino acid, a mixture of two, three or more amino acids may also be envisioned. However, the copolyamides formed would then comprise three, four, or more units, respectively.

When A represents a lactam, it may be chosen from pyrrolidinone, 2-piperidinone, enantholactam, caprylolactam, pelargolactam, decanolactam, undecanolactam and lauryllactam (A=12).

Preferably, A denotes a unit obtained from a monomer chosen from 10-aminoundecanoic acid (noted 11), 11-aminoundecanoic acid (noted 11), 12-aminododecanoic acid (noted 12) and lauryllactam (noted 12).

When the unit A is a unit corresponding to the formula (Ca diamine).(Cb diacid), the unit (Ca diamine) is chosen from linear or branched aliphatic diamines, cycloaliphatic diamines and alkylaromatic diamines.

When the diamine is linear and aliphatic, of formula $H_2N$—$(CH_2)_a$—$NH_2$, the monomer (Ca diamine) is preferably chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and the diamines obtained from fatty acids.

When the monomer (Ca diamine) is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclo-hexyl)methane (BMACM or MACM), p-bis(aminocyclohexyl)-methane (PACM) and isopropylidenedi(cyclohexylamine) (PACP). It may also comprise the following carbon backbones: norbornylmethane, cyclohexylmethane, dicyclohexylpropane, bis(methylcyclohexyl), bis(methyl-cyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the monomer (Ca diamine) is alkylaromatic, it is chosen from 1,3-xylylenediamine and 1,4-xylylenediamine.

The unit (Cb diacid) is, itself, chosen from linear or branched aliphatic diacids, cycloaliphatic diacids and aromatic diacids.

When the monomer (Cb diacid) is linear and aliphatic, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b-11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20), docosanedioic acid (b=22) and fatty acid dimers containing 36 carbons.

The fatty acid dimers mentioned above are dimerized fatty acids obtained by oligomerization or polymerization of unsaturated monobasic fatty acids bearing a long hydrocarbon-based chain (such as linoleic acid and oleic acid), as described especially in document EP 0 471 566.

When the diacid is cycloaliphatic, it may comprise the following carbon backbones: norbornyl methane, cyclohexane, cyclohexylmethane, dicyclohexylmethane, dicyclohexylpropane, bis(methylcyclohexyl), bis(methylcyclohexyl)propane.

When the diacid is aromatic, it is chosen from terephthalic acid (noted T), isophthalic acid (noted I) and naphthenic diacids.

Preferably, the unit A denotes aliphatic units, whether these units are derived from an amino acid, a lactam or a product of reaction of a Ca diamine and of a Cb diacid.

More particularly, the unit A denotes the following units: 11, 12, 6, 6.10, 6.12, 6.14, 6.18, 10.10, 10.12, 10.14, 10.18 and 12.12.

The unit X itself denotes a unit obtained from a diamine comprising a number of carbon atoms, noted x, of between 4 and 36, advantageously between 9 and 18 and preferentially between 10 and 18. This unit (Cx diamine) is chosen from linear or branched aliphatic diamines.

When the diamine is linear and aliphatic, the diamine is of formula $H_2N-(CH_2)_x-NH_2$ and is chosen from butanediamine (x=4), pentanediamine (x=5), hexanediamine (x=6), heptanediamine (x=7), octanediamine (x=8), nonanediamine (x=9), decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22) and the diamines obtained from fatty acids.

When the diamine is aliphatic and branched, it may comprise one or more methyl or ethyl substituents on the main chain. For example, the monomer (Cx diamine) may advantageously be chosen from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

Preferably, the unit X denotes a linear aliphatic diamine comprising from 9 to 18 carbon atoms. More preferentially, it denotes a unit obtained from 1,10-decanediamine (x=10).

Among the combinations that may be envisioned, the following copolyamides are of particularly pronounced interest: they are copolyamides corresponding to one of the formulae chosen from 11/6.T, 12/6.T, 11/9.T, 12/9.T, 6.10/9.T, 6.12/9.T, 10.10/9.T, 10.12/9.T, 12.12/9.T, 11/10.T, 12/10.T, 6.10/10.T, 6.12/10.T, 10.10/10.T, 10.12/10.T, 12.12/10.T.

Preferably, the copolyamides are the following: 11/10.T, 12/10.T, 6.10/10.T, 6.12/10.T, 10.10/10.T, 10.12/10.T, 12.12/10.T.

Preferably, the mole proportions of diamine, noted X, and of terephthalic acid, noted T, are preferentially stoichiometric.

Preferably, the mole ratio of the unit(s) A to unit(s) X.T is between 0.05 and 2 and preferably between 0.1 and 1.

According to a second aspect of the invention, the copolyamide comprises only two different units, the unit A and the unit X.T.

According to a third aspect of the invention, the copolyamide also comprises at least three different units, and corresponds to the following formula:

A/X.T/Z, in which the units A and X.T have the same meaning as that defined above, and Z is chosen from a unit obtained from an amino acid, a unit obtained from a lactam and a unit corresponding to the formula (Cd diamine).(Ce diacid), with d representing the number of carbon atoms in the diamine and e representing the number of carbon atoms in the diacid, d and e each being between 4 and 36.

When Z represents a unit obtained from an amino acid, it may be chosen from 9-aminononanoic acid (Z=9), 10-aminodecanoic acid (Z=10), 10-aminoundecanoic acid (noted 11), 12-aminododecanoic acid (Z=12) and 11-aminoundecanoic acid (Z=11) and also derivatives thereof, especially N-heptyl-11-aminoundecanoic acid.

In place of an amino acid, a mixture of two, three, or more amino acids may also be envisioned. In this event, the copolyamides formed would then comprise four, five or more units, respectively.

When Z represents a unit obtained from a lactam, it may be chosen from pyrrolidinone, 2-piperidinone, caprolactam (Z=6), enantholactam, caprylolactam, pelargolactam, decanolactam, undecanolactam and lauryllactam (Z=12).

In place of a lactam, a mixture of two, three of more lactams or a mixture of one or more amino acids and of one or more lactams may also be envisioned. In this event, the copolyamides formed would then comprise four, five or more units, respectively.

Among the combinations that may be envisioned, the following copolyamides are of particularly pronounced interest: they are copolyamides corresponding to one of the formulae chosen from 11/9.T/12, 11/9.T/6, 12/9.T/6, 11/10.T/12, 11/10.T/6 and 12/10.T/6, and more particularly 11/10.T/12, 11/10.T/6 and 12/10.T/6.

The particular case in which the unit Z, when it is a unit obtained from a lactam or an amino acid, is strictly identical to the unit A is obviously excluded. Specifically, in this particular hypothesis, the copolyamide under consideration would be the one already envisioned according to the second aspect of the invention.

The unit Z may also correspond to the formula (Cd diamine).(Ce diacid), these units having the same meaning as the units (Ca diamine).(Cb diacid) described above in the definition of unit A.

Among all the possible combinations for the copolyamides A/10.T/Z, in which Z is a unit (Cd diamine).(Ce diacid), the copolyamides corresponding to one of the formulae chosen from 11/9.T/9.I, 11/9.T/9.6, 12/9.T/9.I, 12/9.T/9.6, 11/10.T/10I, 11/10.T/10.6, 11/10.T/6.T, 12/10.T/10.I, 12/10.T/10.6, 12/10.T/6.T and preferably 11/10.T/10.I, 11/10.T/10.6, 11/10.T/6.T, 12/10.T/10.I, 12/10.T/10.6 and 12/10.T/6.T, will be retained in particular.

In one advantageous variant of the invention, the mole ratio of the sum of the units A and Z to the unit(s) 10.T (i.e. (A+Z)/10.T) in the terpolymer is between 0.05 and 2 and preferably between 0.1 and 1.

In place of a unit (Cd diamine).(Ce diacid), a mixture of two, three or more units (Cd diamine).(Ce diacid) or a mixture of one or more amino acids and/or one or more lactams with one or more units (Cd diamine).(Ce diacid) may also be envisioned. In this event, the copolyamides formed would then comprise four, five or more units, respectively.

If, with the exception of N-heptyl-11-aminoundecanoic acid, the fatty acid dimers and the cycloaliphatic diamines, the comonomers or starting materials envisioned in the present description (amino acids, diamines, diacids) are effectively linear, there is nothing that prohibits envisioning them being totally or partially branched, such as 2-methyl-1,5-diaminopentane, or partially unsaturated.

It will be noted in particular that the C18 dicarboxylic acid may be octadecanedioic acid, which is saturated, or octadecenedioic acid, which itself contains an unsaturation.

The copolyamide is present in the composition in a content of between 45% and 95% by weight and preferably between 55% and 90% by weight, relative to the total weight of the composition.

Preferably, the copolyamide has a melting point of greater than 240° C., advantageously between 240° C. and 310° C. and more particularly between 260° C. and 280° C.

The copolyamide included in the composition according to the invention may comprise monomers originating from resources derived from renewable raw materials, i.e. comprising organic carbon derived from biomass and determined according to standard ASTM D6866. These monomers derived from renewable raw materials may be 1,10-decanediamine or, when they are present, especially 11-aminoundecanoic acid, linear aliphatic diamines and diacids as defined above.

The Crosslinked Polyolefins

The composition according to the invention comprises at least one crosslinked polyolefin, the said crosslinked polyolefin being in the form of a phase dispersed in the matrix formed by the copolyamide A/X.T.

This dispersed phase is derived from the reaction of at least two polyolefins bearing groups that are mutually reactive.

More particularly, the dispersed phase is derived from the reaction:
of a product (A) comprising an unsaturated epoxide,
of a product (B) comprising an unsaturated carboxylic acid anhydride or a polycarboxylic acid, and optionally
of a product (C) comprising an unsaturated carboxylic acid or an α,ω-aminocarboxylic acid.

Product (A)

Examples of products (A) that may be mentioned include polymers containing ethylene and an unsaturated epoxide.

According to a first form of the invention, (A) is either a polyolefin grafted with an unsaturated epoxide, or a copolymer of ethylene and of an unsaturated epoxide.

Advantageously, product (A) is a copolymer of ethylene and of an unsaturated epoxide.

As regards the polyolefin grafted with an unsaturated epoxide, the term "polyolefin" means polymers comprising olefin units, for instance ethylene, propylene, 1-butene or any other α-olefin unit. By way of example, mention may be made of:
polyethylenes such as LDPE, HDPE, LLDPE or VLDPE, polypropylene, ethylene/propylene copolymers, EPRs (ethylene/propylene rubber) or alternatively PE metallocenes (copolymers obtained by single-site catalysis);
styrene/ethylene-butene/styrene (SEBS) block copolymers, styrene/butadiene/styrene (SBS) block copolymers, styrene/isoprene/styrene (SIS) block copolymers, styrene/ethylene-propylene/styrene block copolymers and ethylene/propylene/diene (EDPM) block copolymers;
copolymers of ethylene with at least one product chosen from unsaturated carboxylic acid salts, unsaturated carboxylic acid esters and vinyl esters of saturated carboxylic acids.

Advantageously, the polyolefin is chosen from LLDPE, VLDPE, polypropylene, ethylene/vinyl acetate copolymers and ethylene/alkyl(meth)acrylate copolymers. The density may be advantageously between 0.86 and 0.965, the melt flow index (MFI) may be between 0.3 and 40 (in g/10 min at 190° C. under 2.16 kg).

As regards the copolymers of ethylene and of an unsaturated epoxide, mention may be made, for example, of copolymers of ethylene, of an alkyl(meth)acrylate and of an unsaturated epoxide or copolymers of ethylene, of a vinyl ester of a saturated carboxylic acid and of an unsaturated epoxide. The amount of epoxide may be up to 15% by weight of the copolymer (A) and the amount of ethylene at least 50% by weight of (A).

Advantageously, (A) is a copolymer of ethylene, of an alkyl(meth)acrylate and of an unsaturated epoxide.

Preferably, the alkyl(meth)acrylate is such that the alkyl contains from 2 to 10 carbon atoms.

The MFI (melt flow index) of (A) may be, for example, between 0.1 and 50 (g/10 min at 190° C. under 2.16 kg).

Examples of alkyl acrylates or methacrylates that may be used are especially methyl methacrylate, ethyl acrylate, n-butyl acrylate, isobutyl acrylate and 2-ethylhexyl acrylate.

Examples of unsaturated epoxides that may be used are especially:
aliphatic glycidyl esters and ethers such as allyl glycidyl ether, vinyl glycidyl ether, glycidyl maleate and itaconate, and glycidyl acrylate and methacrylate, and
alicyclic glycidyl esters and ethers such as 2-cyclohexene-1-glycidyl ether, cyclohexene-4,5-diglycidyl carboxylate, cyclohexene-4-glycidyl carboxylate, 5-norbornene-2-methyl-2-glycidyl carboxylate and endocis-bicyclo(2,2,1)-5-heptene-2,3-diglycidyl dicarboxylate.

According to one advantageous version of the invention, product (A) is a copolymer of ethylene, of methyl acrylate and of glycidyl methacrylate. It is especially possible to use the product sold by the company Arkema under the name Lotader® AX8900.

According to another form of the invention, product (A) is a product bearing two epoxide functions, for instance bisphenol A diglycidyl ether (BADGE).

Product (B)

According to a first variant of the invention, product (B) is a polymer containing ethylene and an unsaturated carboxylic acid anhydride.

Product (B) is either a copolymer of ethylene and of an unsaturated carboxylic acid anhydride, or a polyolefin grafted with an unsaturated carboxylic acid anhydride.

As has been seen above, the polyolefin is a polymer comprising olefin units such as ethylene, propylene, 1-butene units or any other α-olefin. This polyolefin may be chosen especially from the examples of polyolefins mentioned above for product (A), when the latter is a polyolefin grafted with an unsaturated epoxide.

Examples of unsaturated dicarboxylic acid anhydrides that may be used as constituents of the product (B) are especially maleic anhydride, itaconic anhydride, citraconic anhydride and tetrahydrophthalic anhydride.

Advantageously, product (B) is a copolymer of ethylene and of an unsaturated carboxylic acid anhydride.

By way of example, mention may be made of copolymers of ethylene, of an alkyl(meth)acrylate and of an unsaturated carboxylic acid anhydride and copolymers of ethylene, of a vinyl ester of a saturated carboxylic acid and of an unsaturated carboxylic acid anhydride.

The amount of unsaturated carboxylic anhydride may be up to 15% by weight of the copolymer (B) and the amount of ethylene at least 50% by weight of the copolymer (B).

These copolymers may also comprise an alkyl(meth)acrylate, this other comonomers possibly representing up to 30% of (B).

Advantageously, the product (B) is a copolymer of ethylene, of an alkyl(meth)acrylate and of an unsaturated carboxylic anhydride. Preferably, the alkyl(meth)acrylate is such that the alkyl contains from 2 to 10 carbon atoms.

The alkyl acrylate or methacrylate may be chosen from those mentioned above for product (A).

According to one advantageous version of the invention, product (B) is copolymer of ethylene, of ethyl acrylate and of maleic anhydride. The product sold by the company Arkema under the name Lotader® 4700 may especially be used.

The MFI of (B) may be, for example, between 0.1 and 50 (g/10 min at 190° C. under 2.16 kg).

According to a second variant of the invention, product (B) may be chosen from aliphatic, alicyclic or aromatic polycarboxylic acids and partial or total anhydrides thereof.

As examples of aliphatic acids, mention may be made of succinic acid, glutaric acid, pimelic acid, azelaic acid, sebacic acid, adipic acid, dodecanedicarboxylic acid, octadecanedicarboxylic acid, dodecenesuccinic acid and butanetetracarboxylic acid.

As examples of alicyclic acids, mention may be made of cyclopentanedicarboxylic acid, cyclopentane-tricarboxylic acid, cyclopentanetetracarboxylic acid, cyclohexanedicarboxylic acid, hexanetricarboxylic acid, methylcyclopentanedicarboxylic acid, tetrahydrophthalic acid, endomethylenetetrahydrophthalic acid and methylenedomethylenetetrahydrophthalic acid.

As examples of aromatic acids, mention may be made of phthalic acid, isophthalic acid, terephthalic acid, trimellitic acid, trimesic acid and pyromellitic acid.

As examples of anhydrides, mention may be made of partial or total anhydrides of the preceding acids.

Adipic acid is advantageously used.

It would not constitute a departure from the context of the invention if part of the maleic anhydride of product (B), according to the first and second variants described above, were partly hydrolyzed.

Product (C)

According to a first variant of the invention, product (C) comprises an unsaturated carboxylic acid.

Examples that may be mentioned include the hydrolyzed products (B).

Product (C) is, for example, a copolymer of ethylene and of an unsaturated carboxylic acid, and advantageously a copolymer of ethylene and of (meth)acrylic acid.

Mention may also be made of copolymers of ethylene, of an alkyl(meth)acrylate and of acrylic acid.

According to an advantageous version of the invention, product (C) is a copolymer of ethylene, of butyl acrylate and of acrylic acid. It is especially possible to use the product sold by the company BASF under the name Lucalene® 3110.

These copolymers have an MFI of between 0.1 and 50 (g/10 min at 190° C. under 2.16 kg).

The amount of acid may be up to 10% by weight and preferably from 0.5% to 5% by weight of (C). The amount of alkyl(meth)acrylate is from 5% to 40% by weight of (C).

According to a second variant of the invention, the product (C) may also be chosen from $\alpha,\omega$-aminocarboxylic acids, for instance $NH_2(CH_2)_5COOH$, $NH_2(CH_2)_{10}COOH$, and $NH_2(CH_2)_{11}COOH$, and preferably 11-aminoundecanoic acid.

The proportion of (A) and (B) necessary to form the crosslinked phase is determined according to the usual rules of the art by the number of reactive functions present in (A) and in (B).

In any case, the weight proportion of products (A), (B) and, where appropriate, (C) is between 5% and 55% by weight and advantageously between 10% and 45% by weight relative to the total weight of the composition according to the invention.

In one advantageous variant of the invention, the weight proportions of products (A), (B) and, where appropriate, (C) are respectively the following, relative to the total weight of the composition:
- the weight proportion of product (A) is between 2% and 15% by weight,
- the weight proportion of product (B) is between 3% and 40% by weight, and
- the weight proportion of product (C) is between 0 and 12% by weight.

The weight proportion of product (A) is advantageously between 3% and 12% by weight and preferably between 4% and 10% by weight relative to the total weight of the composition.

The weight proportion of product (B) is advantageously between 5% and 38% by weight and preferably between 6% and 36% by weight relative to the total weight of the composition.

The weight proportion of product (C) is advantageously between 2% and 10% by weight and preferably between 3% and 8% by weight relative to the total weight of the composition.

For example, in the crosslinked phases containing (C) chosen from $\alpha,\omega$-aminocarboxylic acids, if (A) is a copolymer of ethylene, of an alkyl(meth)acrylate and of an unsaturated epoxide and (B) a copolymer of ethylene, of an alkyl(meth)acrylate and of an unsaturated carboxylic acid anhydride, the proportions are such that the ratio between the anhydride functions and the epoxy functions is in the region of 1.

The amount of $\alpha,\omega$-aminocarboxylic acid is then from 0.1% to 3% by weight and preferably 0.5% to 1.5% by weight of (A) and (B).

As regards (C) comprising an unsaturated carboxylic acid, i.e. (C) being chosen, for example, from ethylene/alkyl(meth)acrylate/acrylic acid copolymers, the amount of (C) and (B) may be chosen such that the number of acid functions and of anhydride functions is at least equal to the number of epoxide functions. Advantageously, products (B) and (C) are used such that (C) represents from 20% to 80% by weight of (B) and preferably from 20% to 50% by weight.

It would not constitute a departure from the context of the invention if a catalyst were added.

These catalysts are generally used for reactions between epoxys and anhydrides.

Among the compounds capable of accelerating the reaction between the epoxy function present in (A) and the anhydride or acid function present in (B), mention may be made especially of:
- tertiary amines such as dimethyllaurylamine, dimethylstearylamine, N-butylmorpholine, N,N-dimethylcyclohexylamine, benzyldimethylamine, pyridine, 4-dimethylaminopyridine, 1-methylimidazole, tetramethylethylhydrazine, N,N-dimethylpiperazine, N,N,N',N'-tetramethyl-1,6-hexanediamine, a mixture of tertiary amines containing from 16 to 18 carbons and known under the name dimethyltallowamine;
- 1,4-diazabicyclo[2.2.2]octane (DABCO);
- tertiary phosphines such as triphenylphosphine;
- zinc alkyldithiocarbamates.

The amount of these catalysts is advantageously from 0.1% to 3% by weight and preferably from 0.5% to 1% by weight of (A)+(B)+(C).

Advantageously, the crosslinked polyolefin(s) originate(s) from the reaction of the three products (A), (B) and (C).

The composition according to the invention comprises from 5% to 55% by weight, relative to the total weight of the composition, of at least one crosslinked polyolefin.

Preferably, the composition comprises from 10% to 45% by weight, relative to the total weight of the composition, of at least one crosslinked polyolefin.

The Additional Polymers

A composition in accordance with the invention may also comprise additional polymers, and especially at least a third polymer, such a polymer being different than the crosslinked polyolefins and the semiaromatic polyamides mentioned hereinabove.

Advantageously, this third polymer may be chosen from a semicrystalline polyamide, an amorphous polyamide, a semicrystalline copolyamide, an amorphous copolyamide, a polyamide-block-ether, a polyetheramide, a polyesteramide, a polyphenylene sulfide (PPS), a polyphenylene oxide (PPO), a noncrosslinked polyolefin, as opposed to a crosslinked polyolefin envisioned hereinabove, this noncrosslinked polyolefin possibly being functional or nonfunctional, a fluoropolymer such as PTFE, ETFE, PVDF, and mixtures thereof.

As regards the noncrosslinked polyolefins, mention may be made of the polyolefins described in the chapter "Crosslinked polyolefins" which are intended to be grafted with reactive groups. Mention may be made especially of products (A) or (B) or (C) but used alone so as not to crosslink. Examples that may be mentioned include EPR and EPDM elastomers, these elastomers possibly being grafted to facilitate their compatibilization with the copolyamide. Mention may also be made of acrylic elastomers, for example those of the type NBR, HNBR, X-NBR.

The third polymer may also be chosen from starch, which may be modified and/or formulated, cellulose or derivatives thereof such as cellulose acetate or cellulose ethers, polylactic acid, polyglycolic acid and polyhydroxyalkanoates.

Preferably, the third polymer is chosen from aliphatic polyamides and polyamide-block-ethers.

The composition may contain up to 20% by weight, relative to the total weight of the composition, of at least a third polymer.

The Additives

The composition according to the invention may also comprise at least one additive.

This additive may be chosen especially from arylamides, fibers, light stabilizers (especially UV stabilizers and/or heat stabilizers), plasticizers, colorants, mold-release agents, flame retardants, the usual fillers (such as talc, glass fibers, nanofillers, pigments, metal oxides, metals), impact modifiers, surfactants, optical brighteners, antioxidants and natural waxes, and mixtures thereof.

The fillers envisioned in the context of the present invention include standard mineral fillers such as fillers chosen from the group, given in a nonlimiting manner, comprising silica, carbon black, carbon fibers, carbon nanotubes, expanded graphite, titanium oxide, glass beads, kaolin, magnesia and slag. The filler used is more generally formed from glass fibers, the dimension of which is advantageously between 0.20 and 25 mm. A coupling agent may be included therein to improve the adhesion of the fibers to the copolyamide, such as silanes or titanates, which are known to those skilled in the art. Anionic fillers may also be used, such as graphite or aramid fibers (fully aromatic polyamides).

The fillers may be present in a content of between 0 and 50% by weight and preferably between 0 and 30% by weight.

The invention also relates to a process for preparing a composition as defined above. According to this process, the composition may be prepared via any method that makes it possible to obtain a homogeneous mixture containing the composition according to the invention, and optionally other additives, such as melt extrusion, compacting or roll blending.

More particularly, the composition according to the invention is prepared by mixing together in the melt all the ingredients in a "direct" process. Thus, the copolyamide and the compounds for obtaining the crosslinked polyolefin(s), in particular products (A), (B) and optionally (C). The possible additional polymers and/or additives may themselves be introduced either at the same time as the copolyamide and the other ingredients such as products (A), (B) and, where appropriate, (C), or during a subsequent step.

Advantageously, the composition may be obtained in the form of granules by compounding on a tool known to those skilled in the art such as a twin-screw extruder, a cokneader or an internal blender.

The composition according to the invention obtained via the preparation process described above may then be transformed for use or a subsequent transformation known to those skilled in the art using tools such as an injection press or an extruder.

The invention thus also relates to a material or article obtained from at least one composition as defined above via a known transformation process such as injection, extrusion, extrusion-blow molding, coextrusion or multiinjection.

The process for preparing the composition according to the invention may also use a twin-screw extruder that feeds, without intermediate granulation, an injection press or an extruder according to an implementation device known to those skilled in the art.

The composition according to the invention may be used to make up a powder or granules. It may also be used to make a structure for subsequent uses or transformations.

This structure may be monolayer when it is formed only from the composition according to the invention.

This structure may also be a multilayer structure, when it comprises at least two layers and when at least one of the various layers forming the structure is formed from the composition according to the invention.

The powder, the granules or the structure, whether it is a monolayer or multilayer structure, may be in the form of fibers (for example to form a woven or a nonwoven), a film, a tube, filaments, a molded object, a three-dimensional object (obtained via a powder aggregation technique by radiation-induced melting or sintering), a hollow body or an injected piece.

For example, the films and sheets may be used in fields as varied as electronics or decoration.

The composition according to the invention may advantageously be envisioned for the production of all or part of electrical and electronic goods, such as encapsulated solenoids, pumps, telephones, computers, multimedia systems, motor vehicle equipment such as pipes, pipe connectors, pumps, injection-molded pieces under the engine hood, surgical equipment, wrapping or alternatively sports or leisure articles, such as in bicycle equipment (saddle, pedals).

More particularly, these motor vehicle components, when they are in the form of pipes and/or connectors, may in particular be used in air intake devices, cooling devices (for example cooling with air, with coolant liquid, etc.), devices for transporting or transferring fuels or fluids (such as oil, water, etc.). Such components may obviously be made antistatic or conductive, by prior addition of suitable amounts of conductive fillers (such as carbon black, carbon fibers, carbon nanotubes, etc.) to the composition according to the invention.

The composition according to the invention may also be envisioned for the preparation of all or part of components (especially pipes, tubes, connectors, pumps, etc.) for transporting or transferring gases, petroleum and compounds thereof, in particular intended for use in the offshore field.

By way of example, when the composition according to the invention is in powder form, it may be used in coatings, and especially coatings with improved heat resistance intended to cover metallic components used in the transportation of fluids (water, chemical products, petroleum and gases, etc.), used in the motor vehicle sector, for example under the engine hood, and/or in the industrial sector, especially engine pieces. These powders may be applied to various supports via known techniques (for example by dipping, by application using a gun) to form this coating. The powders according to the invention may also be used as additives and/or fillers in paints requiring a high curing temperature, i.e. above 180° C. These powders may be used in anticorrosion compositions, in antiabrasion compositions and/or in paints. The powders according to the invention may also be used in techniques for powder aggregation via radiation-induced melting or sintering, for instance using a laser beam ("laser sintering") or an infrared beam ("IR sintering"), to manufacture objects. Said powders may also be used as paper additives, or alternatively in electrophoresis gels, or as spacers in multilayer composite materials, especially between the layers of multilayer materials. Their uses in the wrapping, toy, textile, motor vehicle, electronic, cosmetics, pharmaceutical and perfumery industries may also be envisioned.

By way of example, granules comprising the composition according to the invention are used for the manufacture, especially by extrusion, of filaments, pipes, films and/or molded objects.

Other aims and advantages of the present invention will emerge on reading the following examples, which are given as a guide and without any limitation.

EXAMPLES

—A—Comparative Study of the Use (Preparation) as a Function of the Amine Content Formulation of the Compositions Three compositions A, B and B' are prepared comprising, as copolyamide, a PA 11/10.T with an 11/10.T molar ratio equal to 0.7, obtained by polycondensation of 11-aminoundecanoic acid, 1,10-decanediamine and terephthalic acid.

This copolyamide is obtained according to three different synthetic routes leading to three different copolyamides noted PA1 for the copolyamide according to the invention and PA2 and PA2' for the comparative copolyamides. It is pointed out that the copolyamide PA2' corresponds to the copolyamide 11/10.T obtained under the conditions of example 1 of document EP 1 505 099.

The characteristics of these three copolyamides are given in Table 1 below:

TABLE 1

|  | PA1 invention | PA2 comparative | PA2' comparative |
|---|---|---|---|
| $CH_3$ chain ends by NMR (meq/g) | 0.105 | 0 | 0.017 |
| $NH_2$ by NMR (meq/g) | 0.037 | 0.135 | 0.014 |
| COOH by NMR (meq/g) | 0.044 | 0.026 | 0.107 |
| Ip by GPC | 2.88 | 2.94 | 4.5 |
| Inherent viscosity | 1.17 | 1.21 | 1.27 |

The inherent viscosity (noted η) is measured according to standard ISO 307.

Copolyamide PA2 differs from copolyamide PA1 according to the invention in the high content of amine chain ends, whereas copolyamide PA2' is distinguished by a content of amine chain ends that is, in contrast, lower.

Compositions A, B and B' are prepared on a twin-screw extruder according to the following formuations given in Table 2, the content of crosslinked polyolefin being equal to 30% by weight relative to the total weight of each of the compositions A, B and B':

TABLE 2

|  | Weight composition | | |
|---|---|---|---|
|  | A invention | B comparative | B' comparative |
| 11/10.T:PA1 | 69.3 | — | — |
| 11/10.T:PA2 | — | 69.3 | — |
| 11/10.T:PA2' | — | — | 69.3 |
| Lotader 4700 | 15 | 15 | 15 |
| Lotader AX8900 | 7.5 | 7.5 | 7.5 |
| Lucalene 3110 | 7.5 | 7.5 | 7.5 |
| Iodine 201 | 0.7 | 0.7 | 0.7 | with

Lotader 4700: copolymer of ethylene, ethyl acrylate and maleic anhydride (coPE/EA/MAH—69/30/1 by weight)

Lotader AX8900: copolymer of ethylene, methyl acrylate and glycidyl methacrylate (coPE/MA/GMA—68/24/8 by weight)

Lucalene 3100: copolymer of ethylene, butyl acrylate and acrylic acid (coPE/BuA/AA—88/8/4 by weight)

Iodine 210: antioxidant additive based on KI and CuI

Study of the Preparation of the Compositions

Compositions A, B and B' are compounded in a conventional manner known to those skilled in the art.

The head pressure measurements reported in Table 3 below show that the comparative composition B is not easily compoundable. Specifically, the head pressure and the applied torque are too high.

Comparative composition B' is, itself, compoundable.

TABLE 3

|  | Compositions | | |
|---|---|---|---|
|  | A invention | B comparative | B' comparative |
| Head pressure in bar (min-max) | 20-26 | 41-59 | 31-39 |
| Torque in % (min-max) | 60-78 | 82-103 | 63-75 |

—B—Comparative Study of the Use
(Transformation) as a Function of the Amine Content
and of the Polydispersity Index Table 4 below describes different copolyamides PA 11/10.T all having an 11/10.T mole ratio equal to 0.7 (as in Table 1).

Table 5 reproduces composition B' of Table 2 and also details compositions C to G obtained under the same conditions as the compositions featured in Table 2. Table 5 also mentions the MFI values (measured at 300° C., with a 5 kg load), the viscosity values for compositions B' and C to G, and also observations regarding the transformation by extrusion of the latter in the form of pipes and the half-life values at 170° C. of specimens in accordance with standard ISO 527 1BA (transformation by injection molding) and obtained from these same compositions B' and C to G.

It is pointed out that the plate-plate viscosity measured in Pa.s is performed at 300° C. (10 rad/s) for 30 minutes.

The half-life corresponds to the time after which the initial value of the elongation at break is divided by 2.

TABLE 4

| 11/10.T | $NH_2$ (meq/g) | COOH (meq/g) | $CH_3$ (meq/g) | Ip | Compounding |
|---|---|---|---|---|---|
| PA2' comparative | 0.014 | 0.107 | 0.017 | 4.5 | OK |
| PA3 invention | 0.027 | 0.059 | 0.104 | 3.5 | OK |
| PA4 invention | 0.044 | 0.044 | 0.105 | 2.9 | OK |
| PA5 invention | 0.058 | 0.036 | 0.106 | 3.5 | OK |
| PA6 comparative | 0.058 | 0.060 | 0.092 | 4.1 | OK |
| PA7 comparative | 0.135 | 0.015 | 0 | 3.0 | gels |

TABLE 5

| Composition | MFI (g/10 min) | Initial plate-plate viscosity (Pa·s) | Plate-plate viscosity after 30' (Pa·s) | Transformation into 8 × 1 mm pipes | Half-life at 170° C. (specimens ISO 527 1BA) |
|---|---|---|---|---|---|
| B' with PA2' comparative | 7.5 | 3035 | 3425 | Difficult (coarse pipe, presence of volatiles) | 250 h |
| C with PA3 invention | 5.8 | 3328 | 4055 | OK | 350 h |
| D with PA4 invention | 3.3 | 4160 | 5141 | OK | 500 h |
| E with PA5 invention | 2.2 | 3590 | 7380 | OK | 600 h |
| F with PA6 comparative | 0.28 | 8300 | 12300 | Impossible after stoppage for 10 min | nc* |
| G with PA7 comparative | 0.1 | 12000 | 29050 | Impossible | 750 h |

*"nc" means not communicated.

We show here that when the Ip or the content of amine chain ends in the copolyamides (PA6 and PA7) has a value greater than that of a copolyamide according to the invention (PA3, PA4 or PA5), the compositions containing them have a viscosity that changes when hot and which makes their transformation by extrusion into a material in pipe form difficult or even impossible.

Moreover, when the content of amine chain ends in the copolyamide (PA2') is less than that of a copolyamide according to the invention (PA3, PA4 or PA5) and when the Ip is greater than that of a copolyamide according to the invention, the transformation by extrusion into a material in pipe form from the corresponding composition B' also becomes more difficult than with a composition in accordance with the invention (C, D or E), especially due to the melt flow index of this composition B': a pipe that has a coarse appearance is obtained. Furthermore, during the transformation, evolution of fumes is observed.

In addition, with reference to the half-life values at 170° C., it is found that the material obtained from composition B' has thermomechanical properties that are less efficient than those of materials obtained from compositions C, D and E in accordance with the invention.

The invention claimed is:

1. A composition comprising:
   from 45% to 95% by weight, relative to the total weight of the composition, of a semiaromatic copolyamide comprising at least two different units corresponding to the formula:

A/X.T, in which

A is a unit obtained from an amino acid, a unit obtained from a lactam or a unit corresponding to the formula (Ca diamine).(Cb diacid), with a representing the number of carbon atoms in the diamine and b representing the number of carbon atoms in the diacid, a and b each being between 4 and 36;

X.T denotes a unit obtained from the polycondensation of a Cx diamine and from terephthalic acid, with x representing the number of carbon atoms in the Cx diamine, x being between 4 and 36, said copolyamide having a polydispersity index, noted as Ip, of less than or equal to 3.5, measured by gel permeation chromatography, said copolyamide having a content of amine chain ends of between 0.020 meq/g and 0.058 meq/g; and a content of acid chain ends between 0.015 and less than or equal to 0.100 meq/g, from 5% to 55% by weight, relative to the total weight of the composition, of at least one crosslinked polyolefin being in the form of a phase dispersed in the matrix formed by the copolyamide A/X.T, said dispersed phase produced by reaction in molten phase of a product (A) comprising polymers containing ethylene and an unsaturated epoxide, the weight proportion of product (A) being between 2% and 15% by weight relative to the total weight of the composition, of a product (B) comprising a copolymer of ethylene and of an unsaturated carboxylic acid anhydride, or a polyolefin grafted with an unsaturated carboxylic acid anhydride, the weight proportion of product (B) being between 3% and 40% by weight, relative to the total weight of the composition, and optionally of a product (C) comprising a copolymer of ethylene and of an unsaturated carboxylic acid, or an α,ω-aminocarboxylic acid the weight proportion of product (C) being between 0 and 12% by weight, relative to the total weight of the composition.

2. The composition as claimed in claim 1, wherein the copolyamide has a polydispersity index of between 2 and 3.5.

3. The composition as claimed in claim 1, wherein the copolyamide has a content of amine chain ends of between 0.030 and 0.050 meq/g.

4. The composition as claimed in claim 1, wherein the copolyamide has a melting point of greater than 240° C.

5. The composition as claimed in claim 1, wherein the unit A is of aliphatic nature.

6. The composition as claimed in claim 1, wherein the unit X denotes a diamine having between 9 and 18 carbon atoms.

7. The composition as claimed in claim 1, wherein the copolyamide is 11/10.T, 12/10.T, 6.10/10.T, 6.12/10.T, 10.10/10.T, 10.12/10.T, 12.12/10.T, 11/10.T/12, 11/10.T/6, 12/10.T/6, 11/10.T/10.I, 11/10.T/10.6, 11/10.T/6.T, 12/10.T/10.I, 12/10.T/10.6 and 12/10.T/6.T.

8. The composition as claimed in claim 1, further comprising up to 20% by weight, relative to the total weight of the composition, of at least one additional polymer that is an aliphatic polyamide, a noncrosslinked polyolefin, a fluoropolymer, a polyphenylene sulfide, a polyphenylene oxide or a polyamide-block-ether.

9. The composition as claimed in claim 1, further comprising at least one additive that is fibers, light stabilizers, heat stabilizers, plasticizers, colorants, mold-release agents, flame retardants, fillers, pigments, metal oxides, metals, impact modifiers, surfactants, optical brighteners, antioxidants, natural waxes, or mixtures thereof.

10. The composition as claimed in claim 9, wherein the light stabilizers are UV stabilizers and the fillers are talc, glass fibers or nanofillers.

11. A process for preparing the composition as defined in claim 1, comprising mixing into a melt all the ingredients.

12. A powder, granules, a monolayer structure or at least one layer of a multilayer structure, comprising a composition of claim 1.

13. Fibers, a film, a pipe, filaments, a molded object, a three-dimensional object obtained via a technique of powder aggregation by radiation-induced melting or sintering, a hollow body or an injection-molded piece, produced from the powder, the granules, the monolayer structure or the multilayer structure as claimed in claim 12.

14. In paints in coatings, in anticorrosion compositions, in antiabrasion compositions, in techniques for powder aggregation by radiation-induced melting or sintering to manufacture objects, in paper, in electrophoresis gels, in multilayer composite materials, in wrappings, in toys, in textiles, in motor vehicles, electronics, cosmetics, pharmaceuticals or perfumes comprising a polyamide, the improvement wherein the polyamide is a composition according to claim 1.

15. In heat resistant coatings for metal pieces used in the transportation of fluids; or heat resistant coatings for metal pieces used in motor vehicles, comprising a polyamide, the improvement wherein the polyamide is a composition according to claim 1.

* * * * *